(12) United States Patent
Martinez et al.

(10) Patent No.: US 6,271,846 B1
(45) Date of Patent: Aug. 7, 2001

(54) METHOD FOR REANCHORING BRANCHES WITHIN A DIRECTORY TREE

(75) Inventors: Anthony Edward Martinez, Austin, TX (US); Michael David Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,919

(22) Filed: Sep. 30, 1998

(51) Int. Cl.[7] ....................................... G06F 3/00
(52) U.S. Cl. .................. 345/357; 345/348; 345/339; 345/356
(58) Field of Search ................... 345/357, 356, 345/348, 339

(56) References Cited

U.S. PATENT DOCUMENTS

| | | | |
|---|---|---|---|
| 4,710,763 | 12/1987 | Franke et al. | 345/10 |
| 5,394,522 | 2/1995 | Sanchez-Frank et al. | 345/349 |
| 5,852,439 | * 12/1998 | Musgrove et al. | 345/339 |
| 5,917,492 | * 6/1999 | Bereiter et al. | 345/357 |
| 5,923,328 | * 7/1999 | Griesmer | 345/357 |
| 6,020,888 | * 2/2000 | Ho | 345/348 |

OTHER PUBLICATIONS

Ron Person (Platinum Edition Using Windows 98, by Que May 20, 1998.*
Windows 98 Directory Tree Screen Dumps (1998).*

* cited by examiner

Primary Examiner—Raymond J. Bayerl
Assistant Examiner—Sy D. Luu
(74) Attorney, Agent, or Firm—David A. Mims, Jr.; Bracewell & Patterson, L.L.P.

(57) ABSTRACT

A system and method for reanchoring logical objects or members of a directory tree within a graphical user interface. First, at least one anchored logical object is designated for reanchoring. Logical objects which have a predetermined relationship with the selected logical object may be placed into a group with the at least one designated logical object. Next, the user selects a reanchor command and the selected group is reanchored. In an illustrative implementation, reanchoring moves the selected group to a location closer to a left margin of the display screen. Reanchoring allows a user to customize the directory tree. Customizing the graphic directory tree allows a user to increase the usability of the directory tree and decrease complexity of existing directory trees.

12 Claims, 10 Drawing Sheets

METHOD FOR REANCHORING BRANCHES WITHIN A DIRECTORY TREE

BACKGROUND OF THE INVENTION

1. Technical Field

The present invention relates in general to manipulations of directory tree structures of a computer system, and in particular to a method and system which allows a computer user to distinguish a subset of members within a directory tree structure. Still more particularly, the present invention relates to a method and system for reanchoring branches of a directory tree to provide optimum management and organization of members within a directory tree.

2. Description of the Related Art

The ability to display user selectable software applications is a necessary feature of a computer operating system. A user must know what software tools are available for selection and execution. Software applications or software tools include, generally, executable files, and viewable data such as database tables and views. Software applications are typically organized by topic into directories. A directory is a cataloging mechanism for files and subordinate directories often referred to as subdirectories.

A directory tree allows a user to organize software applications which have related subject matter or a common theme. Alternately, some software applications automatically organize members in a directory tree configuration. However, existing directory trees are large and have many branches. Further, user commands which allow for directory tree manipulations are very limited in functionality and in scope. Existing directory tree editing functions employ tedious control requirements and provide less than perfect feedback to a user.

A directory tree is a graphic display which lists the directories and subdirectories which are stored in electronically retrievable media such as a disk drive. Software tools which are user selectable are typically displayed in a "tree" structure, hence the term "directory tree" refers to an organized list of directories, subdirectories, files, symbolic links, and other software tools or attributes.

Software tools can be referred to as directory tree members. A "branch" of a directory tree is a group of directory tree members which are linked together and anchored at a root of the directory tree. A branch is typically anchored at the left margin of the display screen and sprawl towards the right margin. Therefore, a branch would contain logical tree objects which are nested within a directory.

Most modern computer operating systems display selectable software in a directory tree configuration. A directory tree is typically displayed within a graphical user interface (GUI). A GUI allows a user to select files and manipulate the display utilizing an instrument such as a mouse. User selection via a mouse can be accomplished by "pointing and clicking" on a selectable feature on the computer display.

Directory trees are commonly displayed within a GUI. For example, in the directory tree control features for International Business Machine's Universal Databases, Windows Explorer, and in Lotus Notes, a hierarchial directory tree provides organization for user selectable software tools within a GUI. The abovementioned and well known directory tree control features vary only subtly in form and function. Selectable software tools are typically, by default, arranged alphabetically in a hierarchial configuration within a directory tree.

In FIG. 1, directory tree 50 is illustrated in a GUI embodiment. Typically, directory trees exist in a computer when the computer is purchased or directory trees are automatically created when software is loaded into the computer. A user can also create directory trees. Directory trees are a way of organizing and grouping files such that a user is not overwhelmed by a long list of unorganized files or software applications.

Typically, portions of a directory tree can be composed by creating a root directory, giving the directory a title, and then adding subdirectories, or files into the directory. Directories are often referred to as folders.

Subdirectories of a folder typically appear indented from the folder title in an "outline" form as depicted in FIG. 1. In large directory trees such as those present in computers which administrate a computer network, multiple branches having nested directory tree structures are typically required. With the complexity of a typical GUI, display area is often limited.

Directory tree utilization becomes awkward when necessary software applications within the directory tree become obscured. For example, directory tree branch structure 82 is not legible in left display window 20 because directory tree branch structure 82 is outside the allotted display window.

If a heavily utilized directory tree member resides outside of the allotted window space, a user must continually utilize screen sizing, scrolling or reframing commands to view and select the nested directory tree members. This cumbersome requirement is unacceptable to many users.

Further, additional directory tree branch structures can branch from directory tree branch structure 82 (not shown). Often, a user will not even know that these deeply nested members exist because these directory tree members reside completely out of view of the user. Assuming a user gets the motivation to search for hidden directory tree branches, a user is required to perform multiple window management functions merely to identify what directory tree selections exist. Traversing a large directory tree can be an inefficient and cumbersome process.

Generally, subdirectories which are placed into a folder typically are "linked" by a vertical dotted line which can be referred to as a linking indicator. In FIG. 1, directory tree members are visually interconnected by outer linking indicator 42 and inner linking indicator 56.

A folder such as Instances 61 which is attached to left margin linking indicator 49 is often called a node or a root of the directory tree. The node provides an anchor for attaching a group of members in a hierarchial format on a directory tree.

For example, Instances 61 is a folder or directory and Databases 80 is a member or subdirectory of Instances 61. The shortcoming in all known GUI embodiments which display directory trees, is that the user cannot focus a group of subdirectories or distinguish a group of logical tree objects within a directory tree. Additionally, a user cannot reorganize a group of subdirectories which are nested within a folder to locate them in close proximity to the left margin.

A logical tree object (LTO) (e.g. a file, a directory, a subdirectory, table, view, symbolic link, shortcut, icons, menu items or aliases) can be utilized to select software features. Users of a directory tree need not be aware of which physical system retrieves or implements a software tool in response to the selection of a LTO. LTOs provide a flexible means for selection of software tools because portions of files, file management systems and software tools might be physically in different locations within a computer memory structure. Often, files which are rarely utilized are physically stored in remote memory locations.

A directory tree format within a GUI allows a user to navigate through available software tool selections and perform information and object manipulation of software files. Often, under-utilized directory and subdirectory selections comprise the viewable portion of the directory tree and frequently utilized selection reside outside of view due to screen space constraints.

It would be desirable to provide a computer user with a feature which allows the user the flexibility to reanchor or rearrange individual LTOs within the window or frame presenting a directory tree. If a user could move frequently utilized subdirectory groups within close proximity to the left margin, a user could become better organized and hence, more efficient.

Additionally, a user might desire to rearrange a directory tree to perform a specific task, and then, after the specific task is complete, the user might want to again rearrange the directory tree.

Known directory tree controls and editing features are very limited in function and do not provide sufficient functionality to a user. Current directory tree features also do not provide adequate feedback to the user.

Poor functionality of directory tree controls is becoming a significant impairment for computer users because the number of files and directories within a computer that a user must manage is growing at a significant rate. This growth is due to the large memory capacity now available in modern personal computers. For example, a computer which provides computer network administration could have a directory tree which contains hundreds of nested members. Further, the linking of external memory through interconnected computers has increased the quantity of files or software tools which are accessible and displayed in a directory tree format to a user.

Often, a user desires to create a customized directory tree to increase his or her efficiency.

Although existing directory tree management functions allow obscuring an entire folder from view by "collapsing the node" or collapsing a directory and all subdirectories under the directory, all known directory tree edit operations will not allow user friendly rearrangement of directory trees.

Typically, the majority of subdirectories within a folder are irrelevant to a current task, yet nested subdirectories cannot be reanchored. Simplification of the directory tree allows a larger quantity of relevant selections to be displayed simultaneously to a user.

In the exemplary embodiment of FIG. 1, directory tree 50 has a considerable quantity of members and only a small portion of the directories and subdirectories available to the user are displayed within the confines of left display window 20. By today's standards even a small directory tree becomes quite cumbersome to view and manipulate. Further, only a fraction of the directories and subdirectories stored in the computer can be displayed at any given time due to the display area constraints.

Typically, a user input is achieved utilizing a pointing device such as a mouse, which controls a graphical pointer on a display such as graphical pointer 40. Graphical pointer 40 provides user feedback such that a user can point to a desired selection utilizing a pointing device and receive feedback by viewing graphical pointer 40. When graphical pointer 40 is properly positioned, a switch or button can be depressed to make a selection. This is called by those having skill in the art "pointing and clicking" on the selection.

All members of a directory tree branch which are part of the node, root or folder entitled Databases 80 can be removed from view by collapsing a node utilizing existing directory tree management functions. Collapsing the node which is anchored by Databases 80 by selecting indictor symbol—75 would hide from view the subdirectories linked by outer linking indicator 42 and inner linking indicator 56. Existing directory tree editors which utilize the symbols + and − to expand and collapse entire directories do not provide adequate directory tree management, and there is a long felt need for improved tree management functions.

Although many of the displayed directory tree members are not executable and hence not selectable, existing directory tree management software does not allow a user to distinguish members of a directory tree. Displaying non-selectable directory tree members is a inefficient utilization of the limited screen space in a GUI environment.

Due to limited display screen area, a typical user desires to display only subdirectories which are selectable thus distinguishing those members. Allowing a user to display only folders which provide user selectable functionality will increase a users organization and efficiency.

Often, directories, subdirectories or logical objects residing in a directory tree are utilized to set up, or initially configure a computer, and thereafter these logical objects are rarely utilized. Additionally, a variety of different user selectable options provide identical selection functionality via different formats.

A user might also desire to focus on a range of objects within a directory tree which are only selectable via the directory tree. Often, when directory tree members are selectable via a means other than a directory tree it less important to display these members within the screen space available.

Currently, known directory tree editors do not allow a user to selectively display a group of deeply nested members within a directory, and therefore, optimum working conditions cannot be achieved. Focusing upon and distinguishing a group of subdirectories within a directory tree allows a larger quantity of important or applicable directory tree members to be simultaneously displayed to the user. Since a user is deprived of the ability to customize the appearance of a directory tree, user productivity is hindered and organizational deficiencies result.

Hence, allowing a user to selectively arrange directories or subdirectories within a directory tree would be desirable. Further, an improved method for making a directory tree more manageable would be helpful. Additionally, a directory tree management system having visual elements which are similar to existing graphical user interface control features is an unfulfilled requirement of computer users. Still Further, an improved directory tree management system that does not add complexity to the visual elements of the GUI, and can use similar interfacing methods such as pointing and clicking, would be very advantageous.

SUMMARY OF THE INVENTION

It is therefore one object of the present invention to provide manipulations of directory tree structures in a computer system.

It is another object of the present invention to provide a method and system which allows a computer user to distinguish a subset of members within a directory tree structure.

Still more particularly, the present invention relates to a method and system for reanchoring branches of a directory tree to provide optimum management and organization of members within a directory tree.

The foregoing objects are achieved as is now described. A system and method for reanchoring logical objects or members of a directory tree within a graphical user interface is provided. First, at least one anchored logical object is designated for reanchoring. Logical objects which have a predetermined relationship with the selected logical object may be placed into a group with the at least one designated logical object. Next, the user selects a reanchor command and the selected group is reanchored. In an illustrative implementation, reanchoring moves the selected group to a location closer to a left margin of the display screen than the original anchor position. Reanchoring allows a user to customize the directory tree. Customizing the directory tree allows a user to increase the usability of the graphic directory tree and decrease complexity of existing directory trees.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2:
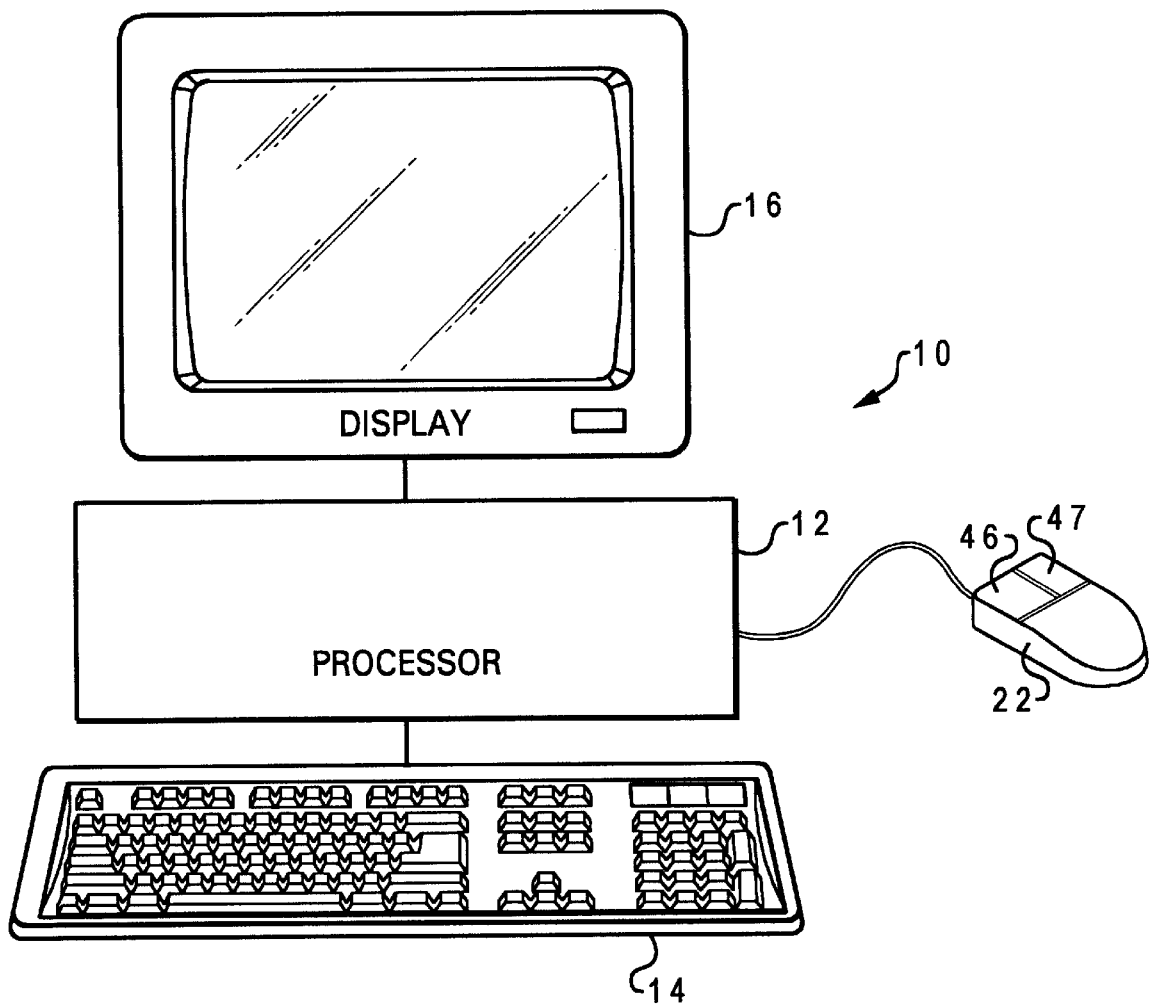
FIG. 2 depicts a conventional computer system which could be utilized to implement the present invention.

With reference now to the figures and in particular with reference to FIG. 2, there is depicted a pictorial representation of a data-processing system in which a preferred embodiment of the present invention may be implemented. A computer 10 is depicted which includes a CPU 12, video display terminal 16, alphanumeric input device (i.e., keyboard 14) having alphanumeric and other keys, and graphical pointing device (mouse) 22. Mouse 22 provides user input by movement of mouse 22 across a surface. Additionally, a primary selection switch 46 and secondary selection switch 47 integral with mouse 22 receives user input for user selections. An additional input device (not shown), such as a track-ball or stylus, (not shown) also can be included with computer 10. Typically, trackballs, styluses or other input devices also provide selection switches to compliment their operation.

Computer 10 can be implemented utilizing any suitable computer, such as an Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data processing systems, such as intelligent work-stations, mini-computers, network computers or personal computers. Computer 10 also preferably includes a graphical user interface that resides within a machine-readable media to direct the operation and user interface of computer 10. Computer 10 also can be implemented utilizing any suitable computer, such as the IBM RISC/6000 computer, also a product of International Business Machines Corporation, located in Armonk, N.Y. "RISC SYSTEM/6000" is a trademark of International Business Machines Corporation.

Figure 3:
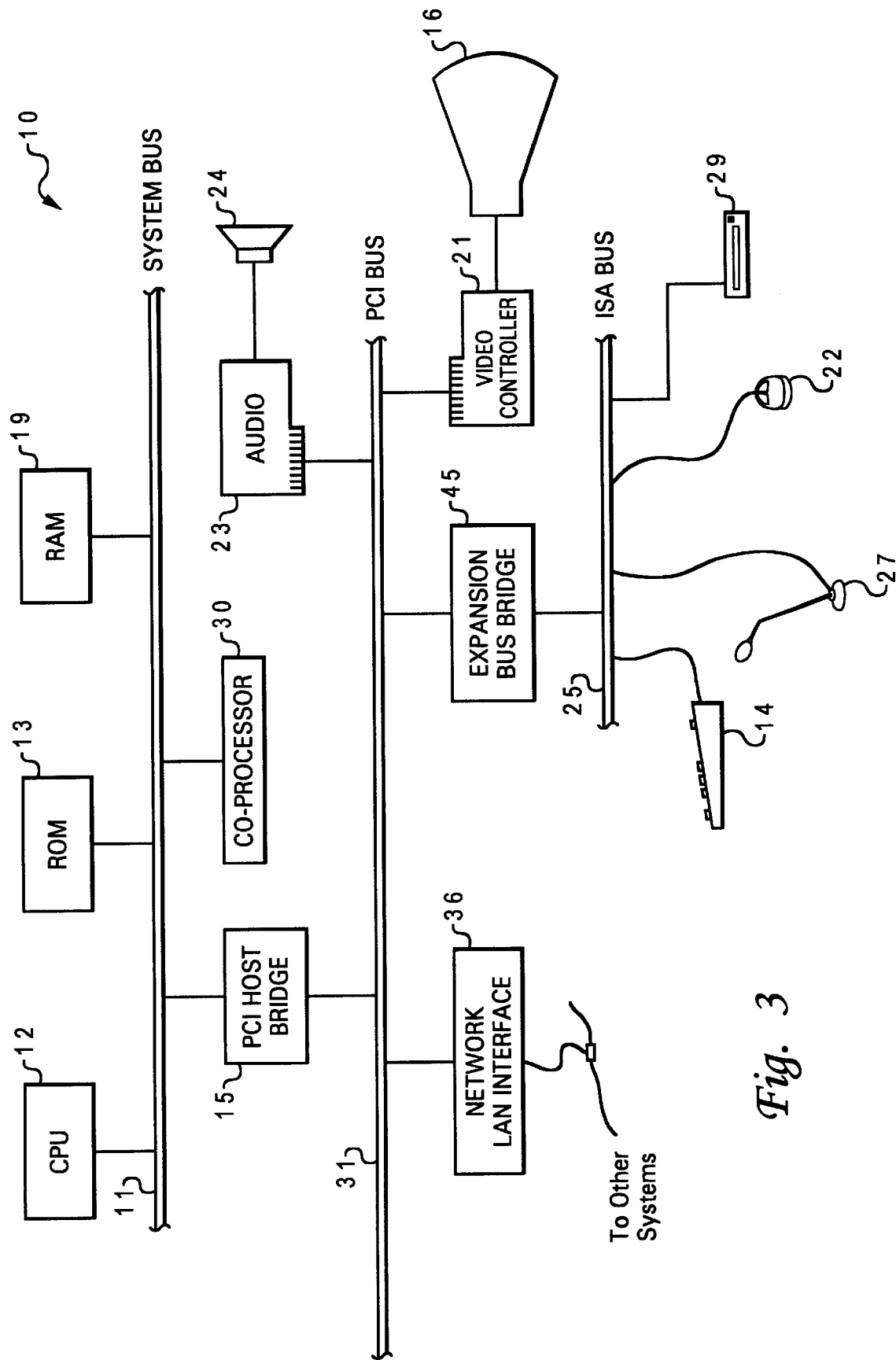
FIG. 3 illustrates a block diagram of a conventional computer system in accordance with FIG. 2.

Referring now to FIG. 3, there is depicted a block diagram of selected components of a computer in accordance with computer 10 of FIG. 2. In FIGS. 2 and 3 like components have like reference numeral call-outs. A preferred embodiment of the present invention may be implemented with the system architectures of FIG. 3. Computer 10 preferably includes a system bus 11. System bus 11 is utilized for interconnecting and establishing communication between various components within computer 10.

Microprocessor or central processing unit (CPU) 12 is connected to system bus 11 and system bus 11 may also have numeric co-processor 30 connected to it. Read-only memory ("ROM") 13 and random-access memory ("RAM") 19 are also connected to system bus 11. ROM 13 is mapped into CPU 12 address space in the range from 640K to 1 megabyte. RAM 19 is attached to system bus 11 and contains system-configuration information. Any suitable machine-readable media may retain a software application program, such as a graphical user interface application, within computer 10, such as RAM 19, ROM 13, a magnetic diskette, magnetic tape, or optical disk.

Also connected to system bus 11 is PCI host bridge 15 which couples system bus 11 to PCI bus 31. PCI host bridge 15 controls the flow of data between PCI bus 31 and various peripherals, adapters, and devices. Expansion bus bridge 45 controls the flow of data from PCI bus 31 to ISA bus 25. ISA bus 25 couples various I/O devices to computer 10. I/O devices include keyboard 14, mouse 22, disk drive 29 and microphone 27.

Keyboard 14, mouse 22 and disk drive 29 typically have controllers (not shown) which are utilized to interface ISA bus 25. Video controller 21 provides a hardware interface for video display terminal 16. Audio controller 23 provides a hardware interface for speaker 24.

A network interface adapter 36 additionally can be connected to PCI bus 31 in order to link computer 10 to other data-processing system networks in a client/server architecture or to groups of computers and associated devices which are connected by communications facilities (not shown).

Figure 4A:
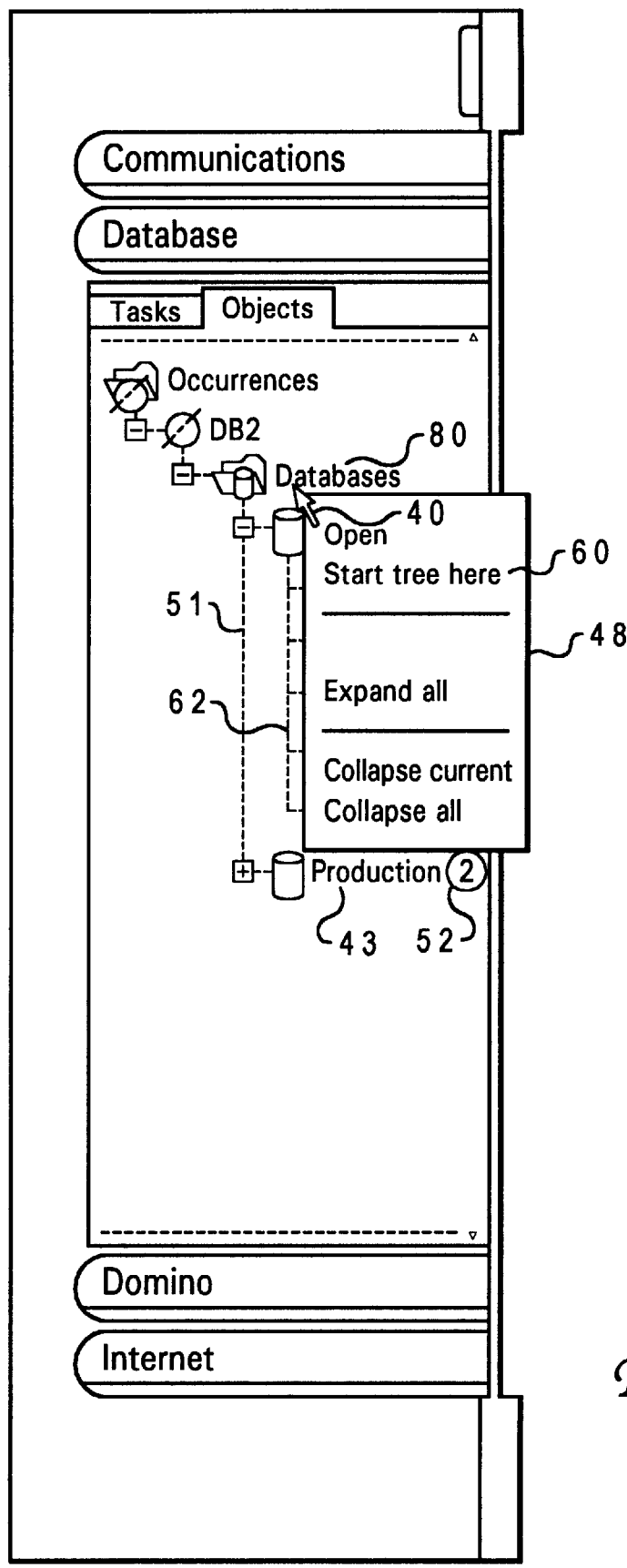
FIG. 4A depicts a pull down menu for a directory tree manipulation in accordance with one implementation of the present invention.

Referring now to FIG. 4A, Databases 80 is visually attached to Production 43 by outer linking line 51. Inner linking line 62 visually attaches Databases 80 to logical tree objects categorized under Databases 80.

In FIG. 4A graphical pointer 40 is superimposed over directory tree member Databases 80. In known GUI environments, a user input of depressing a primary pointing device input such as primary selection switch 46 of FIG. 2, when graphical pointer 40 is superimposed on a member of a directory tree, selects the directory tree member. When a directory tree member is selected, all software elements which are organized under the selected member are displayed in another subwindow (not shown).

In accordance with the present invention when graphical pointer 40 is superimposed over a directory tree member and an alternate pointing device button is depressed, such as secondary selection switch 47 of FIG. 2, pull down menu 48 appears on the display in close proximity to graphical pointer 40.

Secondary selection switch could be an input from a keyboard or any user input. However, it is preferred that the primary selection switch not be utilized to prompt display of pull down menu 48 because this would disrupt a users expectation from existing GUI features.

Although the illustrated embodiment depicts Databases 80 as the selected logical tree object (LTO), any LTO could be selected utilizing the method of the present invention. Pull down menu 48 has many selectable items, including Start tree here 60. The selection of Start tree here 60 allows a user to perform a tree "reanchoring" process, however any nomenclature could be utilized to designate a selectable tree reanchoring command.

A Start tree here 60 selection could be implemented by any user input including a primary or a secondary selection switch. In a preferred embodiment, the method of the present invention automatically moves the selected LTO to the left margin in response to the selection of Start tree here 60.

In an alternate embodiment, an icon or selectable button such as icon 52, can be placed adjacent to each LTO. Icon 52 can be selected by moving graphical pointer 40 in close proximity to icon 52 and depressing a selection switch such as a mouse button. This process is commonly referred to by those having skill in the art as "pointing and clicking on the icon."

Figure 4B:
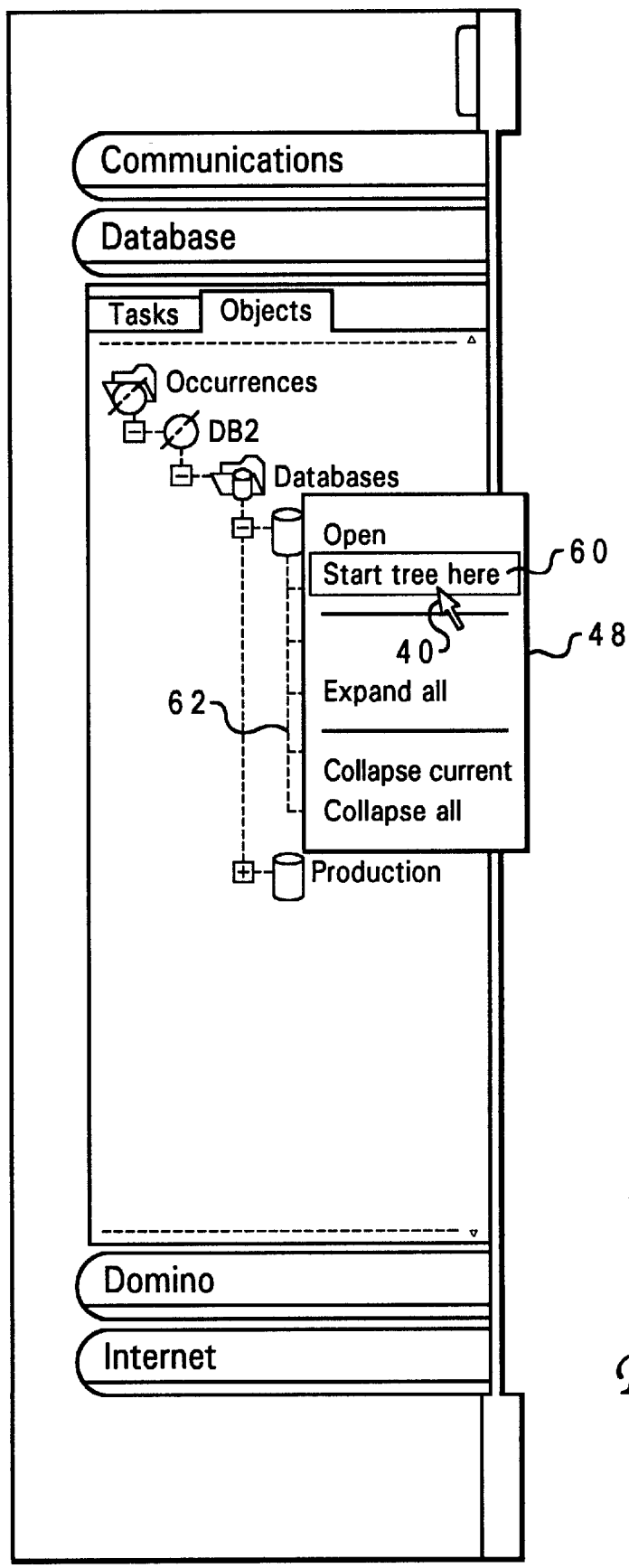
FIG. 4B illustrates a user selection of a directory tree reanchor command in accordance with one implementation of the present invention.

FIG. 4B is an illustration of the continuation of a process started in FIG. 4A. As illustrated in FIG. 4B, graphical pointer 40 has been moved downward in relation to pull down menu 48 and Start tree here 60 becomes highlighted as graphical pointer 40 moves within close proximity to Start tree here 60.

In the illustrated embodiment, the selection of Start tree here 60 or "pointing and clicking" on Start tree here 60 initiates a tree reanchoring command. In response to the reanchor command, the method of the present invention identifies a group of logical tree objects which are anchored to the directory tree by the selected LTO. In the illustration of FIG. 4B, Databases 80 is the selected LTO.

LTOs which are linked to the selected logical tree object by a linking line such as inner linking line 62, are grouped such that all LTOs which are members of the selected LTO can be relocated as a group.

A user input selection was initiated in FIG. 4A when graphical pointer 40 was in close proximity to Databases 80 and the user provided an input stimulus. LTOs which are a subset of Databases 80 are automatically grouped for reanchoring. Alternately stated, the LTOs which are linked to the selected LTO by a linking line and reside down a tree branch from the selected LTO are included in the selected group for reanchoring.

In one embodiment, the method of the present invention does not affect the LTOs which are displayed in the screen space above the selected LTO. The method only affects the LTOs which are a subset of LTOs categorized under the selected LTO. LTOs which are a subset of the selected LTO are LTOs which are visually below the selection point designated by graphical pointer 40.

In another embodiment all LTOs which reside on the branch which the selected LTO resides on are concealed. Hence a branch which is anchored above the branch containing the selected LTO is unaffected. In this embodiment the selected group of LTOs might visually move up the directory tree to an unoccupied space resulting from concealment of unselected LTOs in the same branch.

The members comprising the subset of the selected LTO are typically linked together by at least one vertical linking line. This group of selected directory tree members is hereafter referred to as the "selected objects group." The selected objects group would include any logical tree objects residing on a sub-tree or branch of the selected node, possibly outside of the display area.

In a preferred embodiment, in response to a user selection of Start tree here 60, the selected logical objects group is automatically created and the method of the present invention will graphically distinguish the selected group from surrounding file tree structure by shading, windowing or other means.

Figure 4C:
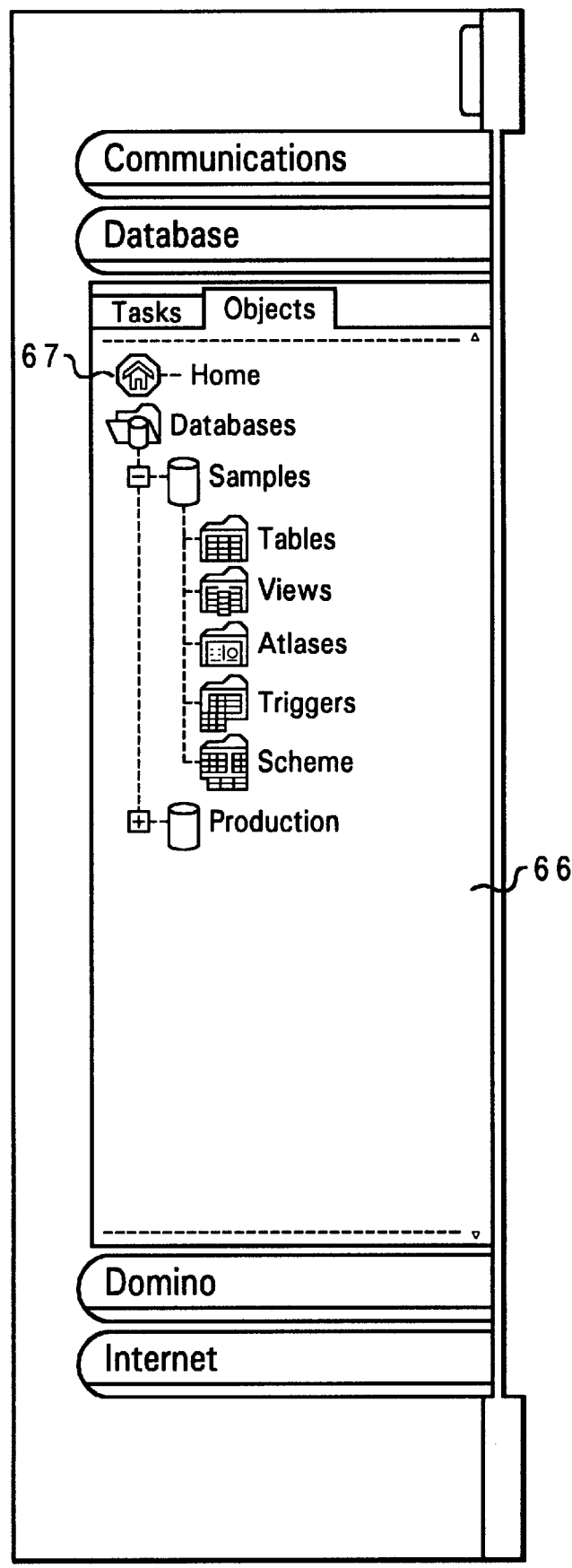
FIG. 4C depicts the results of the execution of a reanchor command in accordance with one implementation of the present invention.

Referring now to FIG. 4C, the method of the present invention has automatically shifted the selected logical objects group vertically across display 66 to the left margin. Alternately stated, in response to the selection of a Start tree here 60 in FIG. 4B, the selected group of logical tree objects has been reanchored to a linking line near the left margin. However, a reanchor command could move the selected LTO to the top left corner of the display screen if LTOs above the selected LTO are concealed in response to the reanchoring command.

Figure 1:
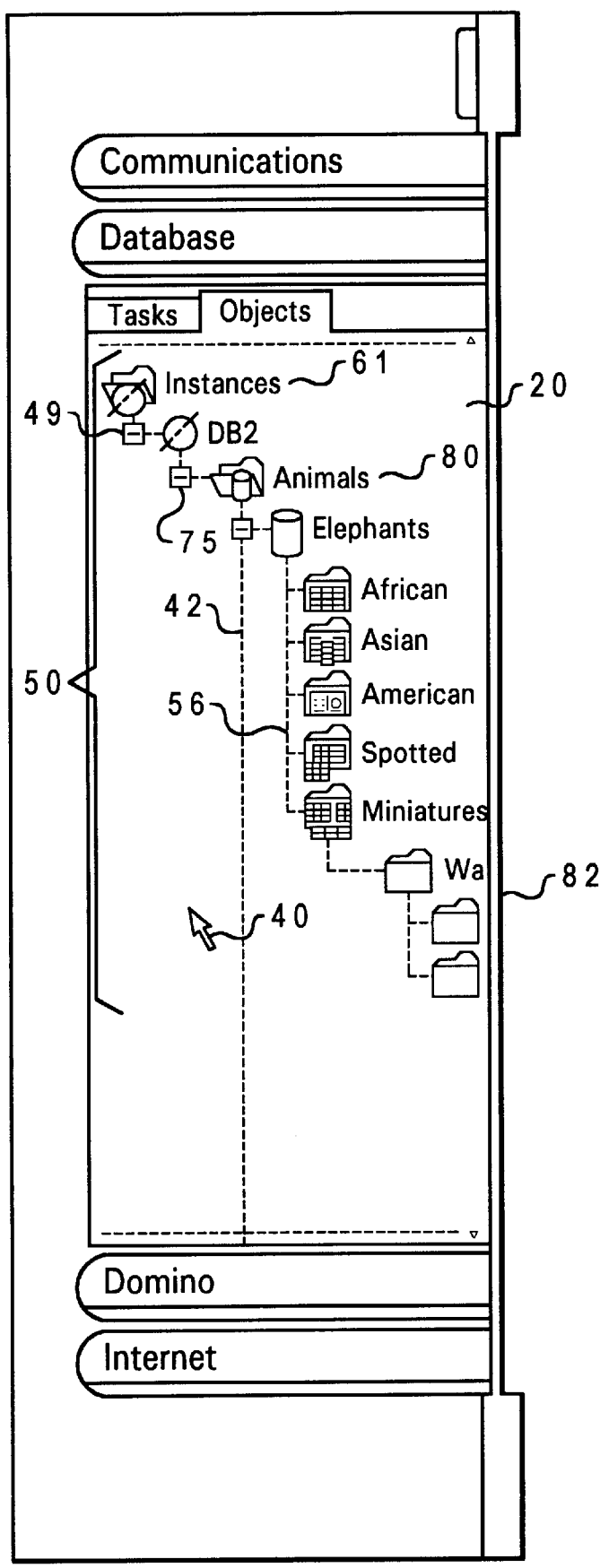
FIG. 1 illustrates problems encountered in the prior art of a graphical user interfaces which display a directory tree.

Reanchoring is particularly important when a tree branch is deeply nested and graphically does not fall within the margins of display 66. This phenomena is illustrated in FIG. 1 by directory tree branch structure 82. Hence, it is often desired by a user to reanchor important directory tree selections which are not visible because they are deeply nested in the directory tree.

The present invention provides changes to a directory structure which are merely cosmetic. No manipulations are performed on the actual organizational structure within the memory of the computer system.

In a preferred embodiment, a user can optionally select a feature to "save the modified directory tree configuration on exit." When this feature is selected, the reanchored directory tree configuration is saved and when the computer is re-started, the modified directory tree is again displayed. If a user does not elect to save the modified directory tree on exit, upon a re-start or a "re-boot" of the computer system, the directory tree would be displayed in its full and unmodified configuration.

At the top of display 66 a home icon 67 is available for user selection. Selecting home icon 67 restores the directory tree back to its original state or back to the directory tree configuration which existed before reanchoring was performed. Therefore, if a user is not satisfied with the performance which results from the reanchoring of a directory tree, a single user selection will "undo" the directory tree configuration created by the present invention.

There is no limit to the number of times that a reanchoring action can occur. The present invention provides very desirable improvements over the prior art. First, after groups of LTO's are reanchored a user can easily locate software tools which previously were hidden because they were deeply nested. The present method provides a user friendly method eliminating the requirement that a user has to continually traverse to deeply nested directory trees branches by considerable scrolling or "page down" selections or operations such as frame re-sizing.

Further, the present invention allows a user to focus on a selected branch immediately when a directory tree is displayed. When desired selections are not displayed a user may not know where to begin to search for them. The present invention essentially reduces the amount of unusable information which is displayed to the user.

The directory tree which can be created by a user provides a customized and simplified directory tree display which is more concise and focused having less unusable LTOs and therefore less complexity. Specifically, a directory tree can be created which allows a user to distinguish frequently utilized LTOs.

In an alternate embodiment, the present invention can also operate in an "block move" mode. For example, the selected group of LTOs can be determined by creating a block around LTOs utilizing a pointing device. The created block or outlined area surrounding the selected LTOs would define membership of the selected group of LTOs. Next, in accordance with known GUI functionality the selected group is visually dragged and dropped at the desired location.

Figure 5A:
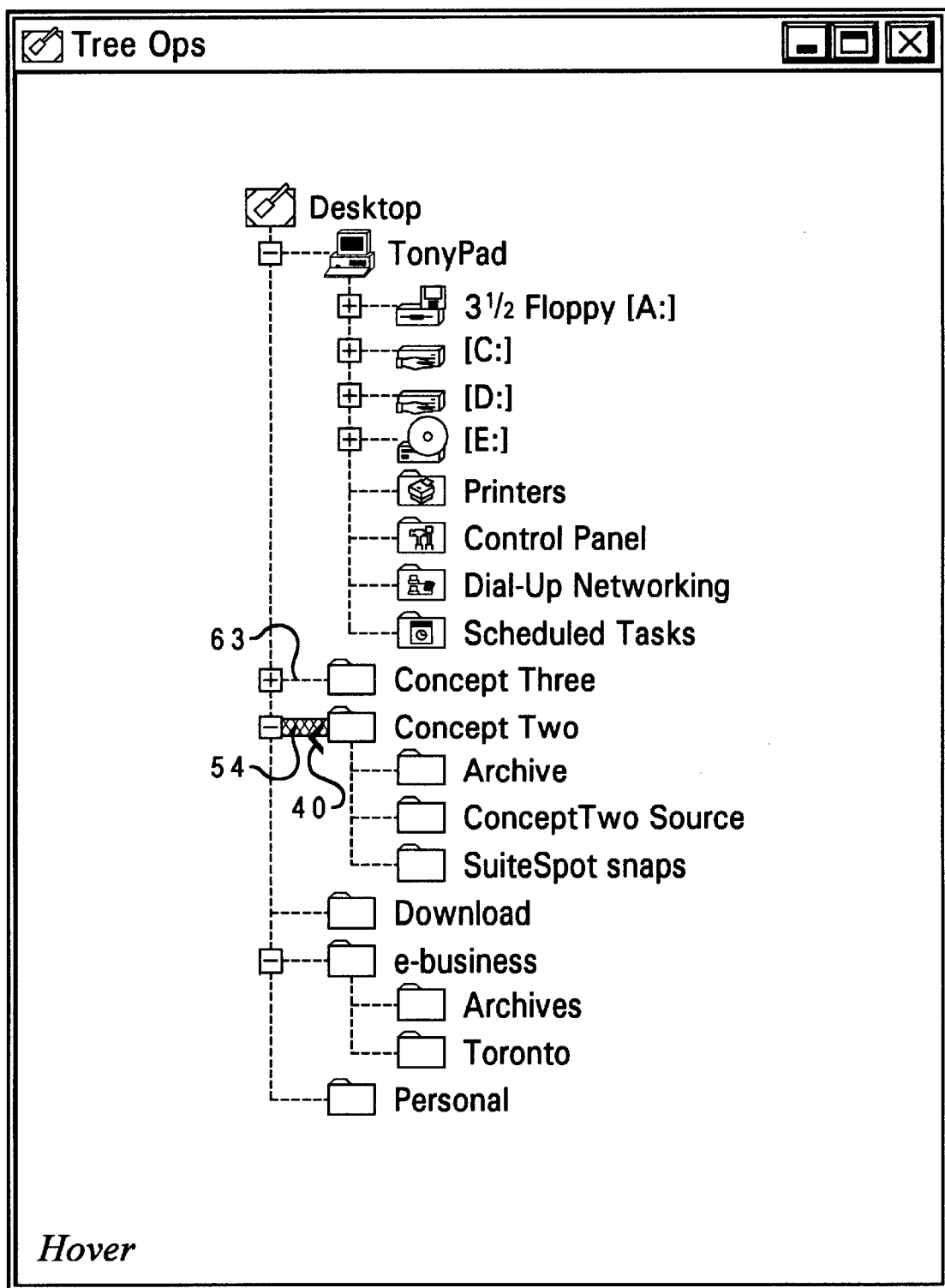
FIG. 5A illustrates a second embodiment of the present invention.

Referring to FIG. 5A, another tree reanchoring embodiment is illustrated. As graphical pointer 40 is moved in close proximity to a horizontal anchoring line, such as first horizontal reanchoring line 54, graphical pointer 40 transforms into a leftward pointing arrow and first horizontal reanchoring line 54 becomes shaded. Second horizontal reanchoring line 63 depicts a horizontal anchoring line not in close proximity to a graphical pointer. Shading of a horizontal line provides feedback to the user indicating that a reanchor command can be initiated by a user.

Figure 5B:
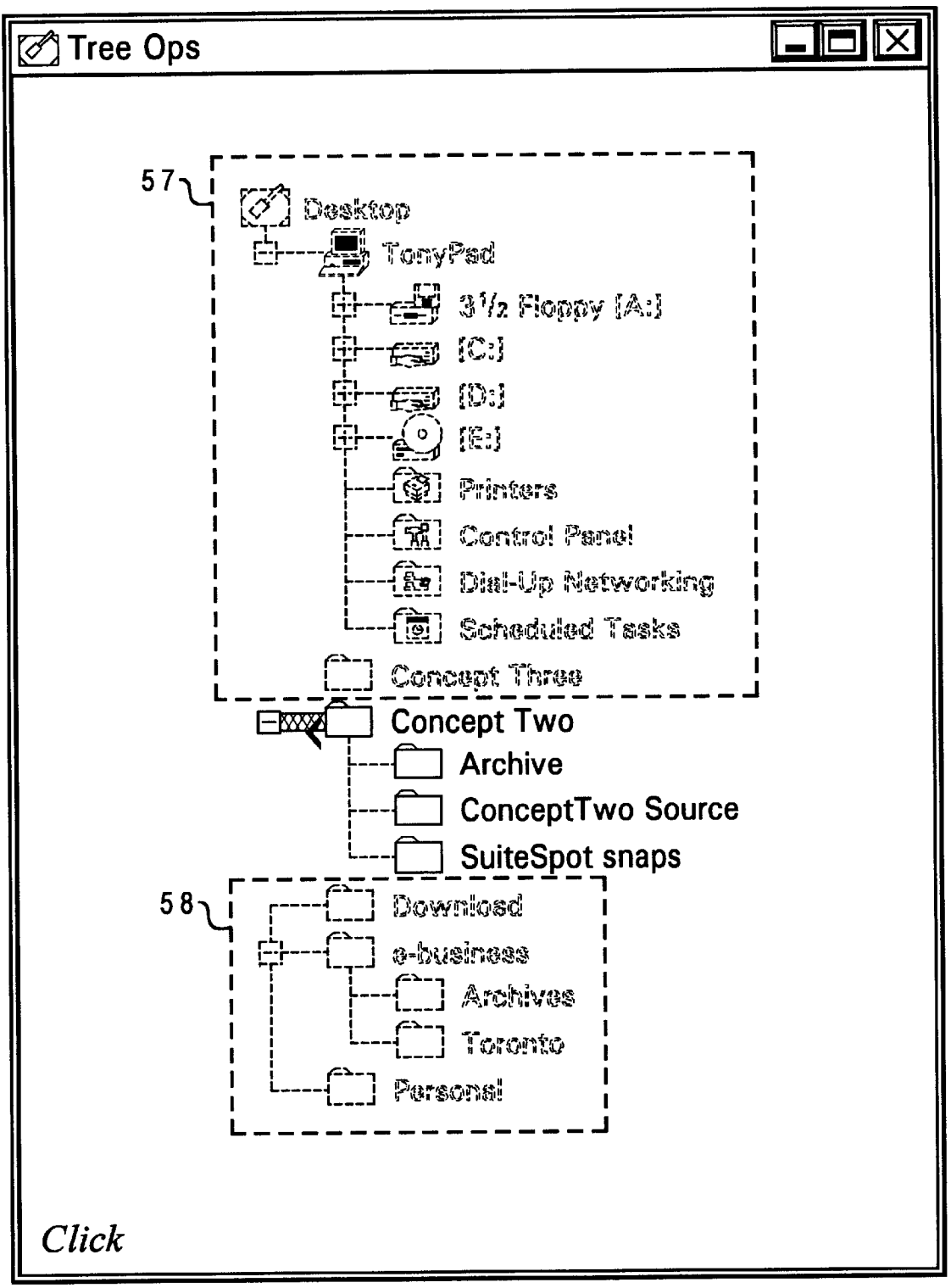
FIG. 5B depicts a reanchor command in accordance with a second embodiment of the present invention.

Referring now to FIG. 5B, a user input has been received to initiate a reanchor command. The user input could be from a primary selection switch. LTOs which reside in first dashed enclosure 57 and second dashed enclosure 58 have faded in response to the user input for reanchoring.

The user input could be initiated by depressing a mouse button or depressing a key on the keyboard. Thus, pointing and clicking on a horizontal anchoring line initiates a reanchor command when graphical pointer 40 is in close proximity to a horizontal anchoring line.

Figure 5C:
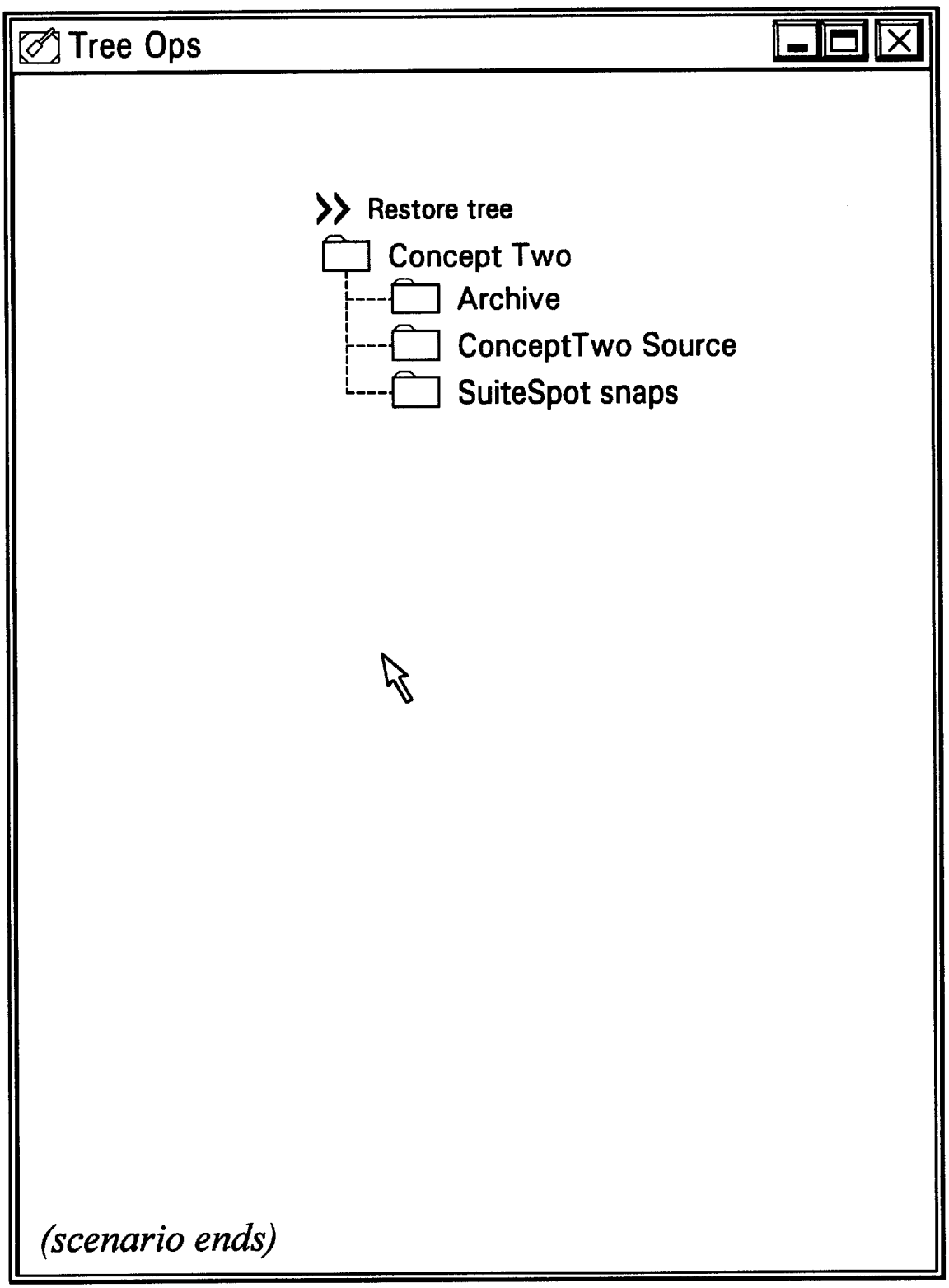
FIG. 5C illustrates the completion of a reanchor command in accordance with a second embodiment of the present invention.

Referring to FIG. 5C, a second user input reanchors the branch associated with the horizontal anchoring line. Alternately stated, all LTOs which are anchored to a vertical linking line by the selected horizontal anchoring line are reanchored to the left margin of the display.

Figure 6:
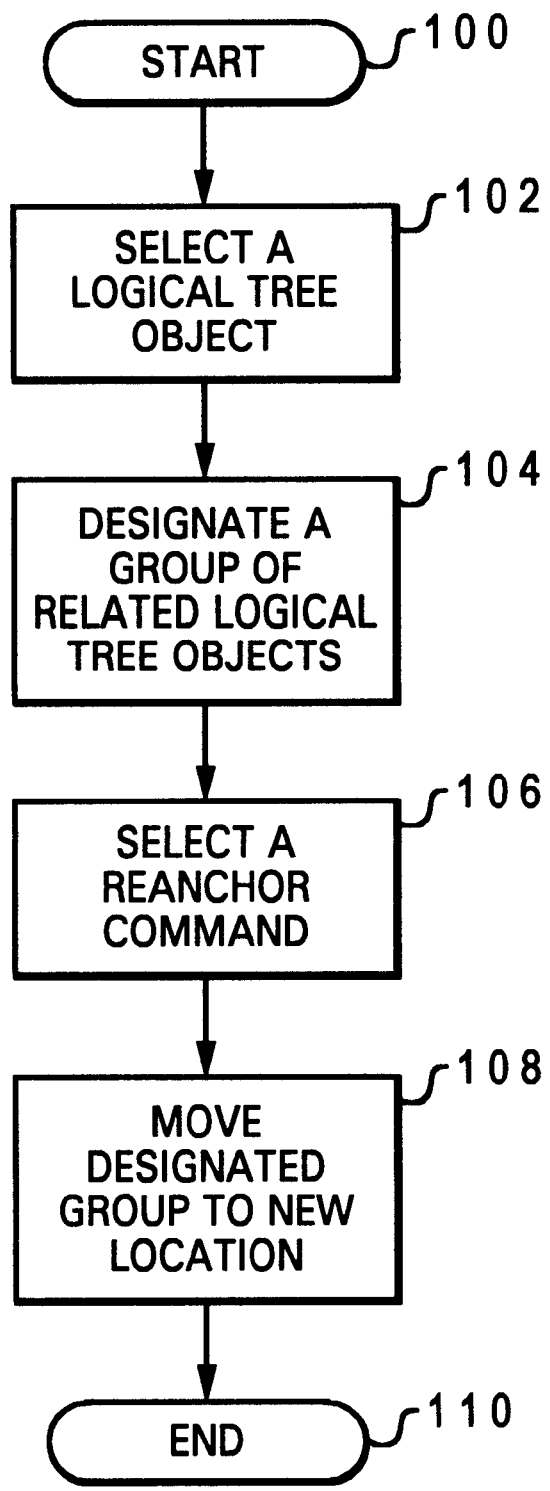
FIG. 6 illustrates a high level flow diagram in accordance with an implementation of the present invention.

Referring now to FIG. 6, a high level flow diagram in accordance with the present invention is depicted. The method starts at block 100 and thereafter proceeds to block 102. As illustrated in block 102, a LTO is selected by a user input. A LTO can be a directory, a subdirectory, a file, a database table, a view or any logical object which provides a link to a software feature.

Next, as illustrated in block 104 a group of LTOs which have a predetermined relationship with the selected logical tree object is formed. Specifically, all logical tree objects which comprise the subset of the selected logical object are included into the selected group of LTOs.

In an alternate embodiment, the step illustrated in block 102 can be implemented by multiple embodiments. Pointing and clicking on the selected directory tree member by keeping the mouse button depressed would allow the user to drag the selected directory tree member and drop the selected directory tree member to a new location. This embodiment would allow the user to move the selected group one increment towards the left margin instead of automatically moving the selected group all of the way to the left margin.

As depicted in block 106, a re-anchor command is provided by the user. Then, as illustrated in block 108 the selected group of LTOs is moved vertically to the left margin. Thereafter, the process ends at block 110.

The function of reanchoring, only affects visual presentation of tree structures. Reanchoring does not affect logical structures (i.e., pathnames).

While the invention has been particularly shown and described with reference to a preferred embodiment, it will be understood by those skilled in the art that various changes in form and detail may be made therein without departing from the spirit and scope of the invention.

What is claimed is:

1. A method for re-anchoring a tree object within a graphical user interface (GUI) by selectively modifying a directory tree view, wherein said directory tree view provides a user-viewable display of a directory tree in which said tree object resides, said method comprising the steps of:

displaying said directory tree as a first directory tree in which said tree object is anchored to a first location within said GUI;

in response to a selection of said tree object within said first directory tree, replacing said first directory tree with a second directory tree, wherein said tree object is a root node within said second directory tree, and wherein said replacing step further comprises inputting a user specified re-anchoring location; and re-anchoring said tree object to a second location within said GUI corresponding to a relative position of said tree object within said second directory tree from which a user can more easily interact with said tree object.

2. The method of claim 1, further comprising the step of generating a tree object group that includes other tree objects having an organizational relationship with said tree object.

3. The method of claim 2, wherein members of said logical tree object group are visually coupled to a linking line.

4. The method of claim 1, wherein said second location is at a left margin of said GUI.

5. The method of claim 1, wherein said step of replacing said first directory tree with a second directory tree is performed in response to selection of an icon within said GUI.

6. The method of claim 1, further comprising the steps of:

positioning a graphical pointing device proximately to said tree object within said first directory tree view, wherein said graphical pointing device includes primary selection means for selecting said tree object in accordance with said first display mode, and wherein said graphical pointing device further includes alternate selection means; and upon said positioning of said graphical pointing device, selecting said tree object from within said first directory tree utilizing said alternate selection means.

7. The method of claim 6, wherein said selecting step further comprises the step of displaying a re-anchor menu utilizing said alternate selection means, wherein said re-anchor menu includes a re-anchor command that initiates said replacement of said first directory tree with said second directory tree.

8. A computer program product stored in a signal bearing media providing a graphical user interface (GUI) to manage a directory tree, said computer program product comprising:

instruction means for displaying a directory tree as a first directory tree in which said tree object is anchored to a first location within said GUI;

instruction means for replacing said first directory tree with a second directory tree in response to user selection of said tree object, wherein said instruction means for replacing said first directory tree with said second directory tree further comprises instruction means for receiving a user specified reanchoring location; and instruction means for, in response to said replacement of said first directory tree with said second directory tree, re-anchoring said tree object to a second location within said GUI corresponding to a relative position of said tree object within said second directory tree from which a user can more easily interact with said tree object.

9. The computer program product of claim 8, further comprising the step of generating a tree object group that includes other tree objects which have an organizational relationship with said tree object.

10. The computer program product of claim 9, wherein members of said tree object group are visually coupled to a vertical linking line.

11. The computer program product of claim 8, wherein said second location is at a left margin of said GUI.

12. The computer program product of claim 8, wherein said instruction means for replacing said first directory tree with said second directory tree further comprises instruction means for performing said replacement in response to selection of an icon.

* * * * *